United States Patent
Silva et al.

(10) Patent No.: US 6,930,194 B2
(45) Date of Patent: Aug. 16, 2005

(54) SILOXANE BISCHLOROFORMATES

(75) Inventors: James Manio Silva, Clifton Park, NY (US); David Michel Dardaris, Ballston Spa, NY (US); Gary Charles Davis, Albany, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/739,998

(22) Filed: Dec. 17, 2003

(65) Prior Publication Data

US 2004/0133024 A1 Jul. 8, 2004

Related U.S. Application Data

(62) Division of application No. 10/223,030, filed on Aug. 16, 2002, now Pat. No. 6,723,864.

(51) Int. Cl.[7] .............................. C07F 7/04; C07F 7/08; C07F 7/18
(52) U.S. Cl. ...................... 556/437; 556/439; 556/440; 556/441
(58) Field of Search ................................ 556/437, 439, 556/440, 441

(56) References Cited

U.S. PATENT DOCUMENTS

| | | | |
|---|---|---|---|
| 5,502,134 A | | 3/1996 | Okamoto et al. ............ 524/537 |
| 5,530,083 A | * | 6/1996 | Phelps et al. .................. 528/25 |
| 6,103,855 A | | 8/2000 | Silva et al. .................. 528/196 |
| 6,268,461 B1 | | 7/2001 | Fyvie et al. ................. 528/196 |
| 6,392,079 B1 | | 5/2002 | Silva et al. .................. 558/282 |

FOREIGN PATENT DOCUMENTS

| | | |
|---|---|---|
| EP | 764676 | 3/1997 |
| EP | 500131 | 1/2001 |
| JP | 9265663 | 10/1997 |
| WO | WO0204545 | 1/2002 |

OTHER PUBLICATIONS

Zhinkin et al. (Chem. Abst. 86:73382) 1977.*
Smirnova et al. (Chem. Abst. 82:73515) 1975.*
Miranov et al. (Chem. Abst. 79:42603) 1973.*
English language translation of Japanese Patent 9265663.
U.S. Appl. No. 09/613,040 (RD–26769), filed Jul. 10, 2000, for "Substantially Single Phase Silicone Copolycarbonates", of Gary C. Davis et al.

* cited by examiner

*Primary Examiner*—Peter O'Sullivan
(74) *Attorney, Agent, or Firm*—Andrew J. Caruso; William E. Powell, III

(57) ABSTRACT

Siloxane bischloroformates are prepared in a continuous process by phosgenating siloxane bisphenols in a flow reactor using a substantial excess of phosgene and sodium hydroxide. While very high levels (>95%) of conversion of the siloxane bisphenol to the corresponding siloxane bischloroformate are achieved using a flow reactor according to the method of the invention, only more modest conversion (~90%) of the siloxane bisphenol to the corresponding siloxane bischloroformate is attained when analogous batch processes are employed. The process holds promise for use in the manufacture of silicone-containing copolycarbonates which requires high purity siloxane bischloroformate intermediates.

16 Claims, 1 Drawing Sheet

SILOXANE BISCHLOROFORMATES

This application is a division of application Ser. No. 10/223,030, filed Aug. 16, 2002 now U.S.Pat. No. 6,723,864, which is hereby incorporated by reference in its entirety.

BACKGROUND OF THE INVENTION

This invention relates to a method for the preparation of siloxane-containing bischloroformates. More particularly the method relates to a continuous method for the preparation of siloxane-containing bischloroformates in a flow reactor.

Silicone-containing copolycarbonates-are prized for their unique combination of ductility, toughness, and flame retardancy. Silicone copolycarbonates are typically prepared by reaction of a mixture of a siloxane-containing bisphenol and a bisphenol such as bisphenol A under interfacial conditions with phosgene and an aqueous acid acceptor such as sodium hydroxide in water. Alternatively, silicone copolycarbonates may be prepared by reaction of a chloroformate-terminated polycarbonate oligomer with a siloxane-containing bisphenol. Typically, the reaction between the chloroformate-terminated polycarbonate oligomer and the siloxane-containing bisphenol is carried out under interfacial conditions similar to those employed when a bisphenol and a siloxane-containing bisphenol are copolymerized directly with phosgene. Such approaches to silicone-containing copolycarbonates are illustrated in Japanese Patent Application JP 9265663, European Patent Application EP 500131, U.S. Pat. No. 5,530,083, U.S. Pat. No. 5,502,134, and copending U.S. patent application Ser. No. 09/613,040.

Siloxane-containing bischloroformates are potentially attractive chemical intermediates for the preparation of silicone-containing materials, including silicone-containing copolycarbonates in which the silicone-containing monomer is incorporated into the polymer as an electrophilic species. As such, improved methods for the preparation of siloxane-containing bischloroformates represent attractive goals. The present invention provides a simple, continuous, high yield method for the preparation of high purity siloxane-containing bischloroformates which is superior to known methods of bischloroformate preparation.

BRIEF SUMMARY OF THE INVENTION

In one aspect, the present invention provides a continuous method for the preparation of bischloroformates of siloxane bisphenols, said method comprising introducing into a flow reactor at least one siloxane bisphenol, at least one alkali metal hydroxide or alkaline earth metal hydroxide, and phosgene, said phosgene being introduced at a rate such that the ratio of phosgene to siloxane bisphenol OH groups is in a range between about 2.5 and about 6 moles of phosgene per mole of siloxane bisphenol OH group, said alkali metal hydroxide or alkaline earth metal hydroxide being introduced as an aqueous solution, said aqueous solution having a concentration of at least about 5 percent by weight metal hydroxide, said metal hydroxide being introduced at a rate such that the molar ratio of metal hydroxide to phosgene is in a range between about 3.5 and about 6.

In another aspect, the present invention relates to the high purity siloxane bischloroformates which may be produced by the method of the present invention.

DETAILED DESCRIPTION OF THE INVENTION

Figure 1:
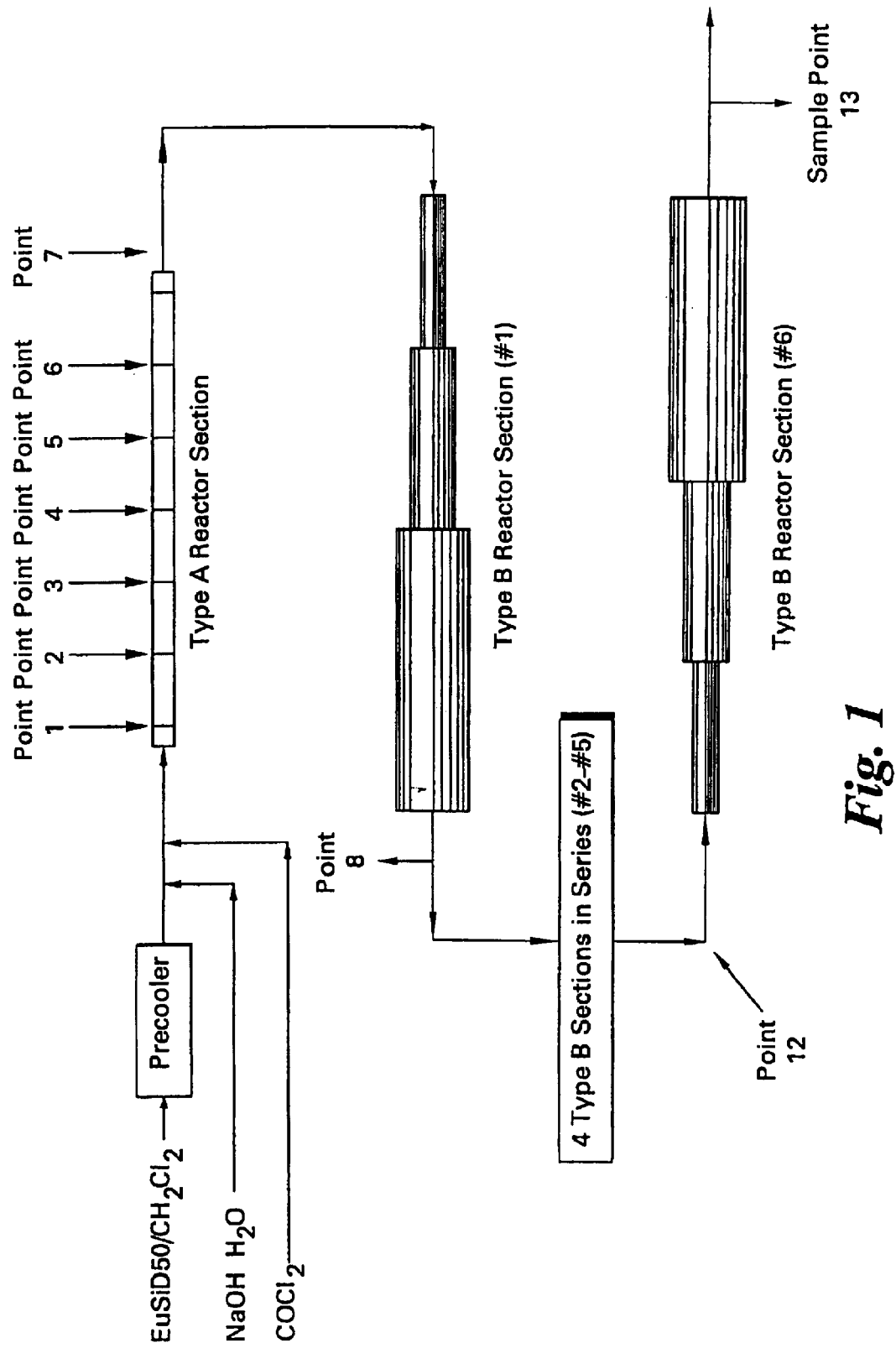
FIG. 1 illustrates a tubular reactor system suitable for use in the production of bischloroformates of siloxane bisphenols using the method of the present invention.

The present invention may be understood more readily by reference to the following detailed description of preferred embodiments of the invention and the examples included herein. In this specification and in the claims which follow, reference will be made to a number of terms which shall be defined to have the following meanings.

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

"BPA" is herein defined as bisphenol A and is also known as 2,2-bis(4-hydroxyphenyl)propane, 4,4'-isopropylidenediphenol and p,p-BPA.

As used herein, the term "bisphenol A polycarbonate" refers to a polycarbonate in which essentially all of the repeat units comprise a bisphenol A residue.

As used herein, the terms "siloxane-containing bischloroformates" and the term "siloxane bischloroformates" are used interchangeably and refer broadly to any bischloroformate comprising one or more siloxane units. Siloxane bischloroformates comprise as a subgroup bischloroformates of siloxane bisphenols.

As used herein, the term "bischloroformates of siloxane bisphenols" refers to bischloroformates prepared from siloxane-containing bisphenols or their equivalents. The disodium salt of a siloxane bisphenol is an example of a species which would function as the equivalent of a siloxane bisphenol.

As used herein, the terms "siloxane-containing bisphenol" and "siloxane bisphenol" are interchangeable and have the same meaning. Siloxane bisphenols are dihydroxy aromatic compounds incorporating one or more siloxane repeat units. Typically, the siloxane bisphenols used to prepare the siloxane bischloroformates are isomeric mixtures, said isomeric mixtures arising in a double hydrosilylation reaction which is typically a synthetic step in the preparation of siloxane bisphenols. Typically, these isomeric mixtures comprise a single major isomer. It will be understood by those skilled in the art, however, that the structure II given for the eugenol siloxane bisphenol used in the Examples and Comparative Examples is idealized in that it represents only the major isomer present in an isomeric mixture. Similarly, each of structures III–IX represents an idealized structure meant to encompass instances in which said structures represent only a major isomer present in an isomeric mixture of siloxane bisphenols or siloxane bischloroformates. The description above should not be construed, however, as limiting the present invention to the use of isomeric mixtures of siloxane bisphenols. The use of siloxane bisphenols which are essentially single isomers falls well within the ambit of the instant invention.

As used herein, the term "d-50 eugenol siloxane bisphenol" indicates a eugenol siloxane bisphenol having idealized structure II wherein the average value of the integer p is about 50. For convenience sake the term "d-50 eugenol siloxane bisphenol" is abbreviated EuSiD50. For convenience the mixture of isomeric d-50 eugenol siloxane bisphenols II and X used in the Examples and Comparative Examples of the instant invention has been represented as a single structure II, the structure of the major isomer present in said mixture, wherein p has an average value of about 50.

The method of the present invention relates to a method for the continuous preparation of bischloroformates of siloxane bisphenols. By continuous, it is meant that reactants are introduced into a suitable reactor system while products are simultaneously removed from the system. In the present invention at least one siloxane bisphenol, phosgene, and at least one alkali metal hydroxide or alkaline earth metal hydroxide are introduced into a flow reactor. The reactants pass through the flow reactor forming product bischloroformate during the passage from the point, or points, at which the reactants are introduced and the point at which an effluent stream containing product emerges from the reactor. It has been discovered that product yields are strongly and unexpectedly dependent upon reaction parameters such as the relative amounts of siloxane bisphenol, metal hydroxide, and phosgene, even when a substantial excess of phosgene or metal hydroxide is present. Additionally, it has been found that under similar conditions operation of the process in a continuous mode provides unexpectedly high yields relative to analogous batch processes.

In the practice of the present invention at least one siloxane bisphenol, phosgene, and at least one alkali metal hydroxide or alkaline earth metal hydroxide are introduced into a flow reactor. The flow reactor is not particularly limited and may be any reactor system which provides for the "upstream" introduction of the reactants and the "downstream" removal of product bischloroformate. Suitable flow reactor systems include tubular reactors, continuous stirred tank reactors, loop reactors, column reactors, and combinations thereof. The flow reactor may comprise a series of flow reactor components, as for example, a series of continuous stirred tank reactors arrayed such that the effluent from a first continuous stirred tank reactor provides the input for a second continuous stirred tank reactor and so forth. Combinations of the various flow reactor components are illustrated by a first column reactor coupled to a downstream continuous stirred tank reactor where the output of the column reactor represents the feed to the continuous stirred tank reactor. Additionally, the flow reactor used according to the method of the present invention may comprise flow reactor components arrayed in a parallel or network fashion, for example, as where the reactants are introduced into a parallel array of two or more tubular reactors the effluent of each of which is introduced into a single continuous stirred tank reactor. In one embodiment of the present invention the flow reactor comprises a series of tubular reactors. In an alternate embodiment the flow reactor comprises a series of continuous stirred tank reactors. The reactants may be introduced into the flow reactor system through one or more feed inlets attached to the flow reactor system. Typically, it is preferred that the reactants be introduced into the flow reactor through at least three feed inlets, for example where a solution of the siloxane bisphenol in an organic solvent such as methylene chloride, aqueous alkali metal hydroxide, and phosgene are introduced through separate feed inlets at or near the upstream end of a tubular reactor. Alternative arrangements wherein one or more of the reactants is introduced through multiple feed inlets at various points along the flow reactor are also possible. Typically, the relative amounts of the reactants present in the flow reactor are controlled by the rate at which they are introduced. For example, a reactant can be introduced into the flow reactor through pumps calibrated to deliver a particular number of moles of said reactant per unit time.

The present invention employs phosgene ($COCl_2$) to convert siloxane bisphenol OH groups into the corresponding chloroformate groups. It has been discovered that the amount of phosgene employed strongly influences product yield. Phosgene is preferably used in an amount corresponding to between about 2.5 and about 6, even more preferably between about 3.5 and about 5.5 moles of phosgene per mole of siloxane bisphenol OH group. Expressed in terms of moles of phosgene per mole of siloxane bisphenol employed, it is preferable to use between about 5 and about 12, and even more preferable between about 7 and about 11 moles of phosgene per mole of siloxane bisphenol.

The alkali metal hydroxide or alkaline earth metal hydroxide, or combination thereof is employed as an aqueous solution used in an amount preferably corresponding to between about 3.5 and about 6, and even more preferably between about 4 and about 5 moles of metal hydroxide per mole of phosgene employed. The concentration of the aqueous metal hydroxide solution employed is preferably between about 5 and about 25, and even more preferably between about 17 and about 25 percent by weight metal hydroxide. In one embodiment of the present invention the concentration of the metal hydroxide solution is at least about 5 percent by weight. Of course, more concentrated solutions of metal hydroxide may be used, as long as they are supplemented with water such that the net metal hydroxide concentration in aqueous solution is about 25% by weight or less.

The siloxane bisphenol is typically introduced into the flow reactor as a solution in a solvent. Typically the solvent is methylene chloride but can be any solvent suitable for use under interfacial reaction conditions. Typically halogenated solvents such as methylene chloride, chloroform, and 1,2-dichloroethane are preferred but other non-halogenated solvents such as toluene or ethyl acetate may also be used. Typically the concentration of the siloxane bisphenol in the solvent is in a range between about 5 and about 95, preferably between about 10 and about 30 percent by weight siloxane bisphenol. As noted, the siloxane bisphenol employed may be a single chemical species or a mixture of chemical species as is typical in siloxane bisphenols which typically comprise a distribution of bisphenols possessing siloxane subunits of varying chain lengths. Alternatively, the siloxane bisphenol may be introduced as an oil, without solvent.

In one embodiment of the present invention the siloxane bisphenol employed comprises structure I

I

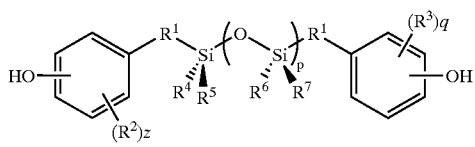

wherein $R^1$ is independently at each occurrence a $C_1$–$C_{10}$ alkylene group optionally substituted by one or more $C_1$–$C_{10}$ alkyl or aryl groups, an oxygen atom, an oxyalkyleneoxy moiety

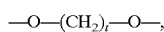

or an oxyalkylene moiety

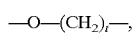

where t is an integer from 2–20;
$R^2$ and $R^3$ are each independently at each occurrence halogen, $C_1$–$C_6$ alkoxy, $C_1$–$C_6$ alkyl, or $C_6$–$C_{10}$ aryl;
z and q are independently integers from 0–4;
$R^4$, $R^5$, $R^6$ and $R^7$ are each independently at each occurrence $C_1$–$C_6$ alkyl aryl, $C_2$–$C_6$ alkenyl, cyano, trifluoropropyl, or styrenyl; and
p is an integer from 1 to about 100.

Representative examples of siloxane bisphenols I include, but are not limited to eugenol siloxane bisphenol II and other siloxane bisphenols, for example

II

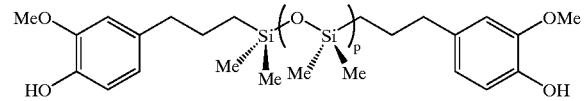

structures III–VII shown below in which p is an integer from 1 to about 100.

III

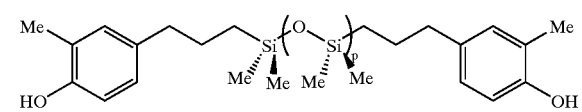

IV

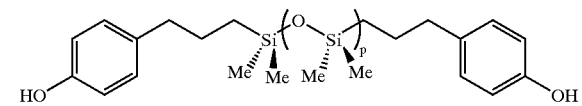

V

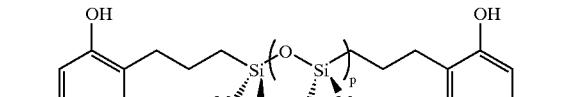

VI

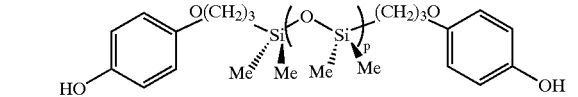

VII

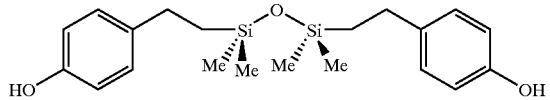

The representative siloxane bisphenols; eugenol siloxane bisphenol II, 4-allyl-2-methylphenol siloxane bisphenol III, 4-allylphenol siloxane bisphenol IV, 2-allylphenol siloxane bisphenol V, 4-allyloxyphenol siloxane bisphenol VI, and 4-vinylphenol siloxane bisphenol VII are named after the aliphatically unsaturated phenols from which they are prepared. Thus, the name eugenol siloxane bisphenol denotes a siloxane bisphenol prepared from eugenol (4-allyl-2-methoxyphenol). Similarly the name 4-allyl-2-methylphenol siloxane bisphenol indicates the siloxane bisphenol prepared from 4-allyl-2-methylphenol. The other names given follow the same naming pattern.

Siloxane bisphenols may be prepared by hydrosilylation of an aliphatically unsaturated phenol with a siloxane dihydride in the presence of a platinum catalyst. This process is illustrated below for eugenol siloxane bisphenol II.

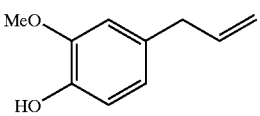 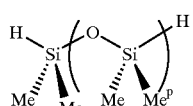

eugenol                    siloxane dihydride

| Pt catalyst

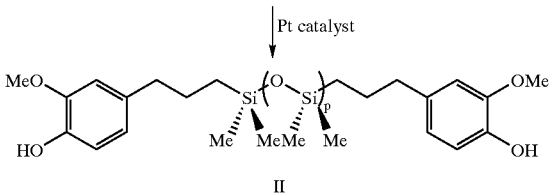

II

In one embodiment of the present invention employing eugenol siloxane bisphenol having structure II as a reactant, p is an integer between about 20 and about 100. In an alternate embodiment eugenol siloxane bisphenol II has a value of p of about 50 said eugenol siloxane bisphenol being represented by the abbreviation EuSiD50. Those skilled in the art will understand that the values given for p in structures I–VIII represent average values and that, for example, eugenol siloxane bisphenol having a value of p of 50 represents a mixture of siloxane bisphenol homologues having an average value of p of about 50.

Typically the reactants, siloxane bisphenol, aqueous metal hydroxide, and phosgene are introduced at one or more upstream positions along the flow reactor. As mentioned, the reactants pass through the flow reactor forming product bischloroformate during the passage from the point at which the reactants are introduced and the point at which an effluent stream containing product emerges from the reactor. The time required for a reactant to travel from the point at which it is introduced to the point at which either it or a product derived from it emerges from the flow reactor is referred to as the residence time for the reactant. Typically, residence times for each reactant is in a range between about 5 and about 800 seconds, preferably between about 10 and about 500 seconds. Those skilled in the art will understand however that the most preferred residence time will depend upon the structure of the starting siloxane bisphenol, the type of flow reactor employed and the like, and that the most preferred residence time may be determined by straightforward and limited experimentation.

In one embodiment the present invention provides a method for the preparation of eugenol bischloroformate VIII

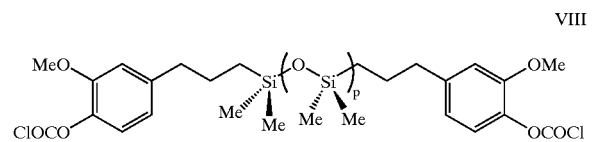

VIII wherein p is an integer from 1 to about 100, said method comprising introducing into a flow reactor a eugenol siloxane bisphenol II

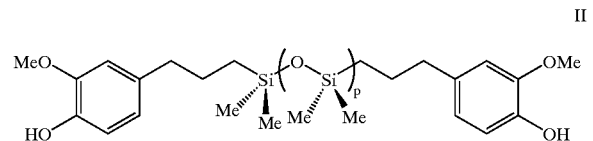

II wherein p is an integer between 1 and about 100, as a solution in methylene chloride comprising from about 5 to about 50 weight percent eugenol siloxane bisphenol, an aqueous solution of sodium hydroxide, and phosgene, said phosgene being introduced at a rate such that the ratio of phosgene to eugenol siloxane bisphenol OH groups is in a range between about 2.5 and about 6 moles of phosgene per mole of eugenol siloxane bisphenol OH group, said aqueous solution of sodium hydroxide having a concentration of at least about 5 percent by weight sodium hydroxide, said aqueous solution of sodium hydroxide being introduced at a rate such that the molar ratio of metal hydroxide to phosgene is in a range between about 3.5 and about 6.

One embodiment of the present invention is a siloxane bischloroformate produced by the method described herein. Thus, in one aspect the present invention is a siloxane bischloroformate produced by the method of the present invention said siloxane bischloroformate comprising structure IX

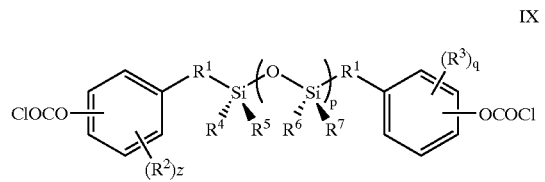

IX wherein $R^1$ is independently at each occurrence a $C_1$–$C_{10}$ alkylene group optionally substituted by one or more $C_1$–$C_{10}$ alkyl or aryl groups, an oxygen atom, an oxyalkyleneoxy moiety

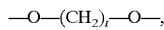

or an oxyalkylene moiety

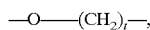

where t is an integer from 2–20;

$R^2$ and $R^3$ are each independently at each occurrence, halogen, $C_1$–$C_6$ alkoxy, $C_1$–$C_6$ alkyl, or $C_6$–$C_{10}$ aryl;

z and q are independently integers from 0–4;

$R^4$, $R^5$, $R^6$ and $R^7$ are each independently at each occurrence $C_1$–$C_6$ alkyl, aryl, $C_2$–$C_6$ alkenyl, cyano, trifluoropropyl, or styrenyl; and p is an integer from 1 to about 100.

In a further embodiment, the present invention affords high purity bischloroformates having low levels of residual hydroxy endgroups. Thus when siloxane bisphenols having structure I are converted using the method of the present invention to the corresponding siloxane bischloroformates having structure IX, the product bischloroformate IX contains less than 10 percent, preferably less than 5 percent and even more preferably less than 1 percent residual hydroxy endgroups. The term "residual hydroxy endgroups" refers to those hydroxy groups present in the starting siloxane bisphenol which are not converted to the corresponding chloroformate groups in the product bischloroformate. During the course of the present invention it was discovered that the principal impurities present in the product siloxane bischloroformate are the starting siloxane bisphenol and bischloroformate half product as determined by $^1$H-NMR spectroscopy. Comparative Example 1 illustrates the high levels of residual hydroxy endgroups present in product siloxane bischloroformate prepared using conventional batch reaction conditions which have been used to prepare other types of chloroformates.

In a further embodiment the present invention is a siloxane bischloroformate comprising structure VIII wherein p is an integer between 1 and about 100, said siloxane bischloroformate comprising fewer than 10 percent hydroxy endgroups, said siloxane bischloroformate comprising less than 0.5 percent carbonate groups.

EXAMPLES

The following examples are set forth to provide those of ordinary skill in the art with a detailed description of how the methods claimed herein are carried out and evaluated, and are not intended to limit the scope of what the inventors regard as their invention. Unless indicated otherwise, parts are by weight and temperature is in ° C. Percent conversion of eugenol siloxane bisphenol OH groups to the corresponding chloroformate groups was determined by proton NMR spectroscopy ($^1$ The starting siloxane bisphenol, d-50 eugenol siloxane bisphenol (EuSiD50), used in the preparation of siloxane bischloroformates was itself prepared by hydrosilylation of approximately two equivalents of eugenol with approximately one equivalent of the d-50 siloxane dihydride, $HSiMe_2(OSiMe_2)_{50}H$, under known hydrosilylation conditions, for example those taught in copending U.S. application Ser. No. 09/613,040. The product eugenol siloxane bisphenol was shown by $^1$H-NMR to be a 95:5 mixture of isomeric siloxane bisphenols, said isomeric siloxane bisphenols having structures II and X respectively,

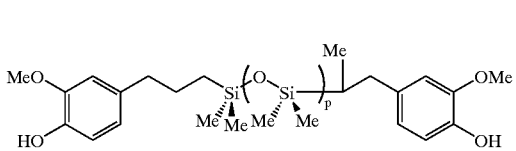

wherein p is a range of integers having an average value of about 50.

As mentioned, isomeric mixtures such as the mixture of siloxane bisphenols having structures II and X are idealized as having the structure of the major isomer II for reasons of convenience. Those skilled in the art will understand that the olefin hydrosilylation chemistry employed to produce bisphenol siloxanes will almost invariably produce the product siloxane bisphenols as a mixture of isomers, said mixture of isomers frequently being inseparable and yet useful in materials synthesis. Those skilled in the art will likewise understand that the conversion of a mixture of isomeric siloxane bisphenols to the corresponding bischloroformates will necessarily produce an isomeric mixture of siloxane bischloroformates. As in the case of the siloxane bisphenols, the structures of said siloxane bischloroformates are idealized herein as having the structure of the major siloxane bischloroformate isomeric component. Thus, the eugenol siloxane bischloroformate prepared in the Examples and Comparative Examples herein was an approximately 95:5 mixture of the siloxane bischloroformates corresponding to siloxane bisphenols II and X. For convenience in describing the practice and attributes of the instant invention, isomeric mixtures of eugenol siloxane bischloroformates are treated as having idealized structure VIII.

Three feed solutions, a 20 weight percent solution of d-50 eugenol siloxane bisphenol (EuSiD50) in methylene chloride, NaOH in water, and phosgene were introduced into a tubular flow reactor in the amounts and feed rates indicated. The tubular flow reactor employed is shown in FIG. 1. Each feed solution was delivered independently to the reactor. The d-50 eugenol siloxane bisphenol in methylene chloride ($CH_2Cl_2$) solution was pre-cooled in coil immersed in an ice water bath. The discharge end of the reactor was vented to a scrubber at atmospheric pressure. The pressure at the feed side of the reactor was 3–5 psig. The tubular flow reactor comprised a series of KO-FLO® static mixers configured as follows: one Type A tubular reactor section followed by six Type B tubular reactor sections. The Type A tubular reactor section comprised six static mixers, each of said mixers being 7 inches in length and having an outer diameter of ¼ of an inch. Each of the Type B tubular reactor sections comprised three static mixers; a first static mixer (11 inches in length, ¼ inch outer diameter), a second static mixer (16 inches in length, ⅜ inch outer diameter), and a third static mixer (16 inches in length, ½ inch outer diameter). The total reactor volume was about 252 milliliters (mL). The initial sections of the reactor were wrapped with woven fabric insulating material. Sampling points were located at several locations along the flow reactor and are indicated in FIG. 1 as "Point 1"–"Point 8", "Point 12" and "Sample Point 13". Sample point 13 was located at the downstream end of the sixth Type B tubular reactor section and corresponded to a reactor volume of about 252 mL. Sample point 8 was located at the downstream edge of the first type B tubular reactor section (that tubular reactor section following the Type A reactor section) and corresponded to a reactor volume of about 57 mL. Sample point 7 was located at the downstream end of the Type A tubular reactor section. Typical residence times are illustrated by Example 2 wherein the residence time was about 90 seconds at sample point 8 and about 400 seconds at sample point 13. In Examples 1–6 feed solutions (1) and (3) were introduced at the following rates:

Feed (1): 7.6 gram/minute (gm/min)EuSiD50 (d-50 eugenol siloxane) 30.4 gram/minute methylene chloride Feed (3): 1.12 gram/minute $COCl_2$ The data in Table 1 demonstrate that using the method of the present invention greater than 95% conversion of eugenol siloxane bisphenol hydroxy groups to the corresponding bischloroformates can be achieved while avoiding carbonate byproduct formation. In Examples 1–6 optimal performance was achieved when the molar ratio of sodium hydroxide to eugenol siloxane bisphenol hydroxy groups was in a range between about 9 and about 12 and the concentration of the aqueous sodium hydroxide was about 17.5 percent by weight sodium hydroxide in water.

TABLE 1

EUGENOL SILOXANE BISCHLOROFORMATE PREPARATION

| Example | Moles NaOH[a] | Wt % NaOH (Feed 2)[b] | Feed 2 rate[c] | % Conversion at 8[d] | % Conversion at 13[e] | Carbonate level[f] |
|---|---|---|---|---|---|---|
| 1 | 6 | 17.5 | 5.18 |  | 82.8 | <0.5% |
| 2 | 9 | 17.5 | 7.77 | 94.4 | 95.3 | <0.5% |
| 3 | 12 | 17.5 | 10.36 | 96.3 | 96.5 | <0.5% |
| 4 | 6 | 12.5 | 5.18 |  | 72.8 | <0.5% |
| 5 | 9 | 12.5 | 7.77 |  | 88.9 | <0.5% |
| 6 | 12 | 12.5 | 10.36 | 92.9 | 93.2 | <0.5% |

[a]Moles NaOH per mole Eugenol siloxane bisphenol OH endgroup
[b]Concentration of NaOH in Feed 2 expressed as weight percent
[c]Rate at which Feed 2 was introduced expressed in grams per minute
[d]Percent of Eugenol siloxane bisphenol OH groups converted to bischloroformate at sample point 8
[e]Percent of Eugenol siloxane bisphenol OH groups converted to bischloroformate at sample point 13
[f]Level of by-product eugenol siloxane carbonate was less than 0.5%

Comparative Example 1

A 500 mL Morton flask was charged with d-50 eugenol siloxane bisphenol (5.0 g, 0.12 mmol), methylene chloride (130 mL) and water (10 mL). The pH was adjusted to and maintained at a pH of from about 0 to about 5 with 25 wt % aqueous sodium hydroxide as phosgene (5.0 g, 50 mmol) was added. Following phosgene addition the pH was raised to about 10 to consume excess phosgene. Hydrochloric acid solution (1N HCL, 135 mL) was added and the product bischloroformate solution was separated by centrifugation. Proton NMR analysis showed only about 90% of the eugenol siloxane bisphenol hydroxy groups had been converted to chloroformate groups. There was little or no carbonate coupled product.

Examples 7–24

The flow reactor used in Examples 7–24 was essentially identical to that used in Examples 1–6 with the following modifications. The flow reactor was configured as shown in FIG. 1. A sample port was added to the system at the downstream end of the first reactor section (Type A tubular reactor section) and a cooler was installed to provide cooling for the aqueous caustic feed in selected experiments. Examples 17–22 utilized the aqueous caustic cooler. In each of Examples 7–24 the solution of eugenol siloxane bisphenol in methylene chloride ($CH_2Cl_2$) was chilled in an ice water bath prior to its introduction into the flow reactor solution cooler. Detailed Experimental conditions used in Examples 7–24 are given Table 2. Additional experimental data and results for the conversion of starting eugenol siloxane bisphenol to product eugenol siloxane bischloroformate in Examples 7–24 are gathered in Table 3. Feed rates employed in Examples 7–24 for eugenol siloxane bisphenol, methylene chloride and phosgene are given below.

| Feed 1: | 7.6 gram/minute EuSiD50 |
| | 30.5 gram/minute $CH_2Cl_2$ |
| Feed 2: | $COCl_2$ (see tables for flow rates) |
| Feed 3: | Aqueous NaOH (see tables for flow rates) |

TABLE 2

EUGENOL SILOXANE BISCHLOROFORMATE REACTION CONDITIONS

| Example | COCl2 gm/min | NaOH Soln gm/min | NaOH ° C. | Point 6 Temp ° C.[a] | Feed Pressure psig | Residence Time Point 7 (sec) | Residence Time Point 13 (sec) |
|---|---|---|---|---|---|---|---|
| 7  | 1.12 | 10.38 | 15.8 | 43.3 | 5   | —  | 804[b] |
| 8  | 1.12 | 12.12 | 13.2 | 38.5 | 2   | 27 | 379 |
| 9  | 1.50 | 16.17 | 14.9 | 41.1 | 3   | 25 | 349 |
| 10 | 1.12 | 15.16 | 14.5 | 35.5 | 2.5 | 25 | 356 |
| 11 | 1.50 | 20.21 | 16.2 | 40.5 | 4   | 23 | 323 |
| 12 | 1.12 | 9.09  | 12.6 | 38.1 | 3   | 29 | 410 |
| 13 | 1.50 | 12.12 | 12.2 | 42.5 | 4.2 | 27 | 384 |
| 14 | 1.12 | 11.37 | 11.9 | 34.9 | 2.0 | 28 | 390 |
| 15 | 1.50 | 15.16 | 12.9 | 41.5 | 3.8 | 26 | 361 |
| 16 | 1.31 | 11.93 | 12.8 | 40.0 | 3   | 27 | 383 |
| 17 | 1.50 | 15.16 | 8.5  | 30.5 | 3   | 26 | 361 |
| 18 | 1.69 | 17.05 | 8.8  | 33.1 | 3   | 25 | 347 |
| 19 | 1.87 | 18.94 | 5.8  | 31.4 | 3   | 24 | 335 |
| 20 | 1.50 | 12.63 | 6.7  | 34.3 | 3   | 27 | 383 |
| 21 | 1.69 | 14.21 | 6.2  | 36.5 | 3.8 | 26 | 371 |
| 22 | 1.87 | 15.79 | 7.2  | 39.3 | 4   | 26 | 360 |
| 23 | 1.87 | 15.79 | 11.4 | 40.2 | 5   | 26 | 360 |
| 24 | 1.87 | 17.22 | 14.0 | 43.8 | 4.5 | 26 | 360 |

[a]Point 6 located between the fifth and sixth static mixing elements of the Type A tubular reaction section (Labeled "Point 6" in FIG. 1)
[b]Each Type B tubular reactor section was followed by a 10 foot long ¼" o.d. copper tube having a volume of 48 mL. The total reactor volume for this example was 540 mL.

TABLE 3

EUGENOL SILOXANE BISCHLOROFORMATE PREPARATION

| Example | Molar ratio $COCl_2$/Eugenol siloxane OH | NaOH/$COCl_2$[a] | wt % NaOH | % Conversion to Chloroformate Sample Point 7 | % Conversion to Chloroformate Sample Point 13 |
|---|---|---|---|---|---|
| 7  | 3 | 4 | 17.5 | —      | 97.7 |
| 8  | 3 | 4 | 15   | 84.7[b] | 91.3 |
| 9  | 4 | 4 | 15   | 93.0   | 97.1 |
| 10 | 3 | 5 | 15   | 85.8   | 91.7 |
| 11 | 4 | 5 | 15   | 97.6   | 98.5 |
| 12 | 3 | 4 | 20   | 88.4   | 96.6 |

TABLE 3-continued

EUGENOL SILOXANE BISCHLOROFORMATE PREPARATION

| Example | Molar ratio COCl$_2$/ Eugenol siloxane OH | NaOH/ COCl$_2$[a] | wt % NaOH | % Conversion to Chloroformate Sample Point 7 | % Conversion to Chloroformate Sample Point 13 |
|---|---|---|---|---|---|
| 13 | 4 | 4 | 20 | 98.0 | 98.5 |
| 14 | 3 | 5 | 20 | 91.3 | 95.7 |
| 15 | 4 | 5 | 20 | 99.0 | 99.0 |
| 16 | 3.5 | 4.5 | 17.5 | 97.1 | 97.1 |
| 17 | 4 | 5 | 20 | 85.5 | 97.6 |
| 18 | 4.5 | 5 | 20 | 87.3 | 98.0 |
| 19 | 5 | 5 | 20 | 88.1 | 99.5 |
| 20 | 4 | 5 | 24 | 84.4 | 98.0 |
| 21 | 4.5 | 5 | 24 | 85.1 | 99.0 |
| 22 | 5 | 5 | 24 | 94.8 | 99.5 |
| 23 | 5 | 5 | 24 | — | >99.5 |
| 24 | 5 | 5 | 22 | — | >99.5 |

[a] mole NaOH per mole of phosgene
[b] Sample taken at sample point No. 8 instead of sample point No. 7

The data in Table 3 demonstrate that essentially complete conversion of eugenol siloxane bisphenol to eugenol siloxane bischloroformate is achievable using the method of the present invention. With the single exception of Example 11 in which approximately 1 percent of the eugenol siloxane bisphenol OH groups were converted to carbonate groups, no carbonate was detected by proton NMR. Thus, the method of the present invention is clearly superior to the batch preparation of eugenol siloxane bischloroformate illustrated by Comparative Example 1.

The invention has been described in detail with particular reference to preferred embodiments thereof, but it will be understood by those skilled in the art that variations and modifications can be effected within the spirit and scope of the invention.

What is claimed is:

1. A siloxane bischloroformate comprising structure IX and comprising fewer than 10 percent hydroxy endgroups

IX

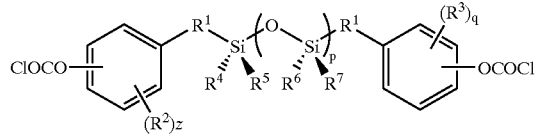

wherein $R^1$ is independently at each occurrence a $C_1$–$C_{10}$ alkylene group optionally substituted by one or more $C_1$–$C_{10}$ alkyl or aryl groups, an oxygen atom, an oxyalkyleneoxy moiety —O—(CH$_2$)$_t$—O—, or an oxyalkylene moiety —O—(CH$_2$)$_t$—, where t is an integer from 2–20;
$R^2$ and $R^3$ are each independently at each occurrence, halogen, $C_1$–$C_6$ alkoxy, $C_1$–$C_6$ alkyl, or $C_6$–$C_{10}$ aryl;
z and q are independently integers from 0–4;
$R^4$, $R^5$, $R^6$ and $R^7$ are each independently at each occurrence $C_1$–$C_6$ alkyl, aryl, $C_2$–$C_6$ alkenyl, trifluoropropyl, or styrenyl; and
p is an integer from 1 to about 100.

2. A siloxane bischloroformate comprising structure VIII

VIII

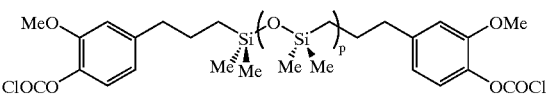

wherein p is an integer between 1 and about 100, said siloxane bischloroformate comprising fewer than 10 percent hydroxy endgroups.

3. A siloxane bischloroformate according to claim 1 comprising fewer than 5 percent hydroxy endgroups.

4. A siloxane bischloroformate according to claim 3 comprising fewer than 1 percent hydroxy endgroups.

5. A siloxane bischloroformate according to claim 1 less than about 0.5 percent carbonate groups.

6. A siloxane bischloroformate according to claim 5 comprising fewer than 5 percent hydroxy endgroups.

7. A siloxane bischloroformate according to claim 6 comprising fewer than 1 percent hydroxy endgroups.

8. A siloxane bischloroformate according to claim 1 wherein p is an integer from 20 to about 100.

9. A siloxane bischloroformate according to claim 1 wherein p has an average value of about 50.

10. A siloxane bischloroformate according to claim 2 comprising fewer than 5 percent hydroxy endgroups.

11. A siloxane bischloroformate according to claim 10 comprising fewer than 1 percent hydroxy endgroups.

12. A siloxane bischloroformate according to claim 2 less than about 0.5 percent carbonate groups.

13. A siloxane bischloroformate according to claim 12 comprising fewer than 5 percent hydroxy endgroups.

14. A siloxane bischloroformate according to claim 13 comprising fewer than 1 percent hydroxy endgroups.

15. A siloxane bischloroformate according to claim 2 wherein p is an integer from 20 to about 100.

16. A siloxane bischloroformate according to claim 2 wherein p has an average value of about 50.

* * * * *